Aug. 1, 1939.  E. GRAY  2,167,946
INTERNAL COMBUSTION ENGINE
Original Filed May 15, 1933  3 Sheets-Sheet 1

Inventor
Edward Gray,
Attorneys

Aug. 1, 1939.  E. GRAY  2,167,946
INTERNAL COMBUSTION ENGINE
Original Filed May 15, 1933   3 Sheets-Sheet 2
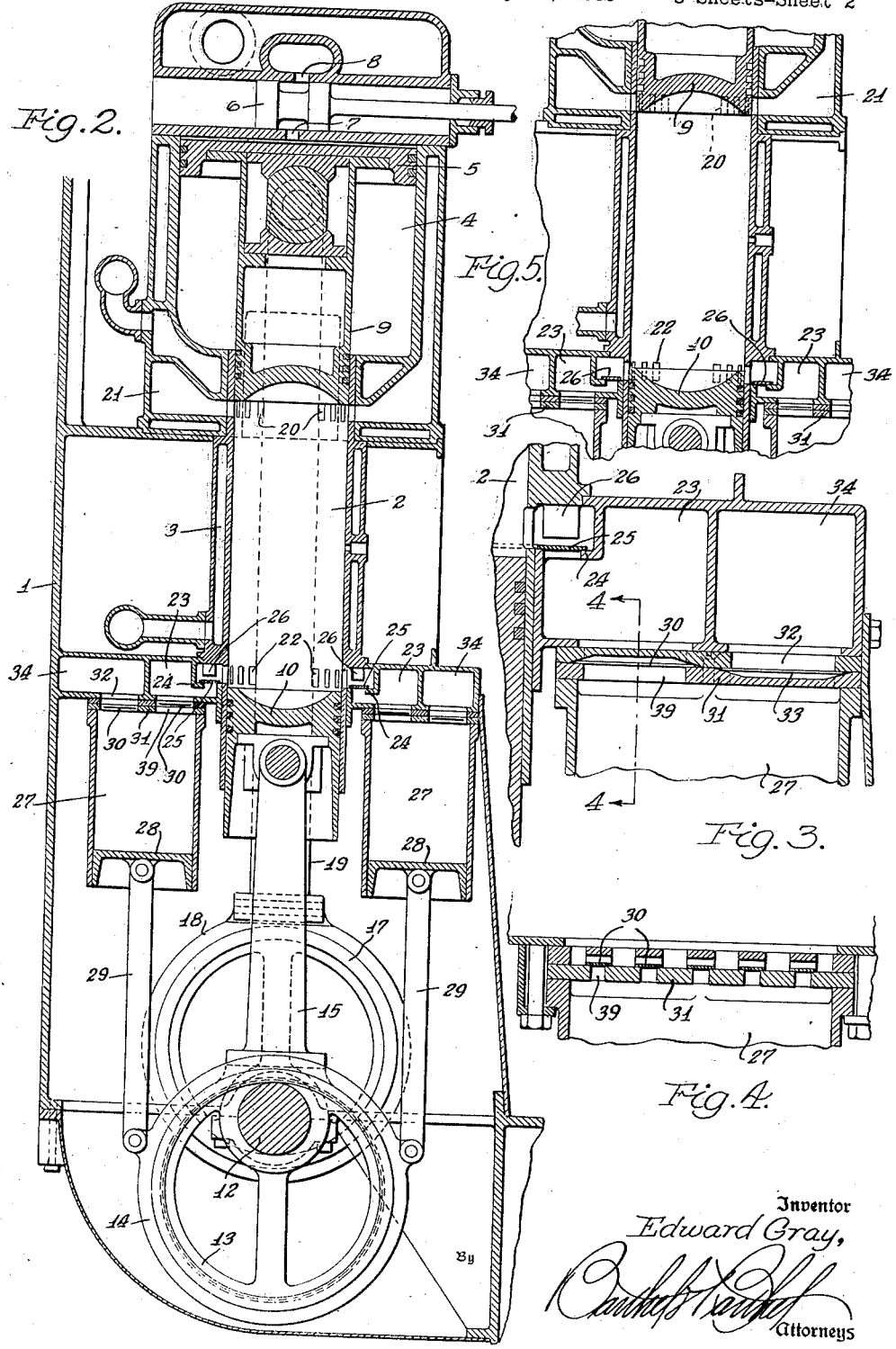
Inventor
Edward Gray,
Attorneys Aug. 1, 1939.　　　　E. GRAY　　　　2,167,946
INTERNAL COMBUSTION ENGINE Original Filed May 15, 1933　　3 Sheets-Sheet 3

Inventor
Edward Gray,
By
Attorneys

Patented Aug. 1, 1939

2,167,946

UNITED STATES PATENT OFFICE 2,167,946

INTERNAL COMBUSTION ENGINE

Edward Gray, Detroit, Mich., assignor of one-half to Gar Wood, Detroit, Mich.

Original application May 15, 1933, Serial No. 671,177, now Patent No. 2,119,535, dated June 7, 1938. Divided and this application June 14, 1937, Serial No. 148,088

7 Claims. (Cl. 123—51)

The present invention relates to internal combustion engines of the oil burning, pressure ignited type, the engine being designed particularly for use in locomotives of the type shown in my co-pending application Serial No. 671,177, filed May 15, 1933, now Patent Number 2,119,535, June 7, 1938, from which the subject matter of the present application is divided. Although designed particularly for locomotive use in connection with rail vehicles the present invention is adapted for other uses such as, for example, marine use.

The present engine is of the two-stroke cycle type and has a pair of opposed pistons operating in each cylinder formation, the pistons being movable outwardly of their cylinder formations under the pressure of fuel combustion. The power shaft is disposed in line with one end of the cylinder formation and the two pistons of each combustion chamber are connected by pitmans to eccentrics on the power shaft in order to convert the rectilinear motion of the pistons into rotary motion of the power shaft.

The valves for controlling the exhaust of burned gases and the intake of fresh air relative to the combustion chamber are of the type which comprises ports formed in the cylinder walls and adapted to be covered and uncovered by respective pistons at the proper stages in the cycle of the engine.

The primary object of the present invention is to provide for efficient scavenging of burned gases from the combustion chamber at the completion of the power stroke and to provide for supercharging of the combustion chamber with fresh air subsequent to the closing of the exhaust ports. To accomplish this object it is necessary to cause the exhaust ports to open prior to opening of the intake ports so that the compressed burned gases present in the combustion chamber after the power stroke of the pistons may be relieved of their pressure prior to connection of the combustion chamber with the intake manifold, which is at a lower pressure. To permit scavenging of the combustion chamber it is necessary to cause the intake ports to open while the exhaust ports are open, whereby compressed air from a scavenging pump may drive the burned gases out of the combustion chamber; and in order to permit supercharging of the combustion chamber with fresh air it is necessary to cause the exhaust ports to close after the burned gases have been driven from the combustion chamber and the intake ports to remain open after the exhaust ports have been closed so that the scavenging pump charges the combustion chamber with compressed air. With an engine as here contemplated, that is, with the stroke of the opposed pistons uniform in length and in perfect time whereby the cranks of the two pistons reach dead center at the same time in the engine cycle, and with the exhaust and intake ports formed in the cylinder walls, arrangement of the exhaust ports so that they would be uncovered prior to the uncovering of the intake ports would result in a condition where the intake ports would be covered at a stage in the cycle subsequent to the covering of the intake ports. According to the present invention, however, the intake and exhaust valve ports are so arranged with respect to the piston strokes that the intake valve ports are uncovered prior to the uncovering of the exhaust ports and they remain uncovered until after the exhaust ports are again covered, and a supplemental valve is provided in conjunction with the intake ports which remains closed while the burned gases are under pressure and which automatically opens and remains open after the pressure of the burned gases has been dissipated by connection of the combustion chamber with the exhaust manifold.

Another object of the present invention is to provide an engine of the character above referred to embodying a steam piston in connection with one of the opposed pistons and operating therethrough to apply rotative force to the power shaft. In the case of a locomotive engine as here contemplated it is necessary either to provide a change speed transmission between the engine and the wheels of the locomotive or to provide an auxiliary starting engine which makes possible operation of the pressure ignited engine at speeds much lower than the normal minimum speed of operation. In this connection it is also contemplated that the heat generated by combustion of the fuel will be utilized to generate at least a part of the steam required for operation of the steam piston and in some cases all of the steam required.

Another object of the present invention is to provide an internal combustion engine of the character above referred to embodying a power shaft having eccentrics thereon instead of the usual cranks. The use of eccentrics permits the several cylinders of the engine to be closely grouped without interfering with the pitmans which extend from the pistons which are remote from the power shaft to the eccentrics thereon, which pitmans of necessity extend between adjacent pairs of cylinder formations. The eccentrics also permit the provision of bearings with power shaft at relatively close intervals, as compared with the possibility for bearings where cranks are employed, and in addition they provide for the drive to reciprocal type scavenging pumps direct from the power shaft. In the present invention, two reciprocal type scavenging pumps are provided and are disposed on diametrically opposite sides of each cylinder and the pistons of the pumps are reciprocated by pitmans which are connected to the eccentric strap member to which one of the piston pitmans is connected.

With the above and other ends in view the invention is more fully disclosed with reference to the accompanying drawings, in which—

Fig. 2 is a vertical transverse section;

Fig. 3 is a vertical fragmental section of a detail, shown on an enlarged scale;

Fig. 4 is a section taken on the line 4—4 of Fig. 3;

Figure 1:
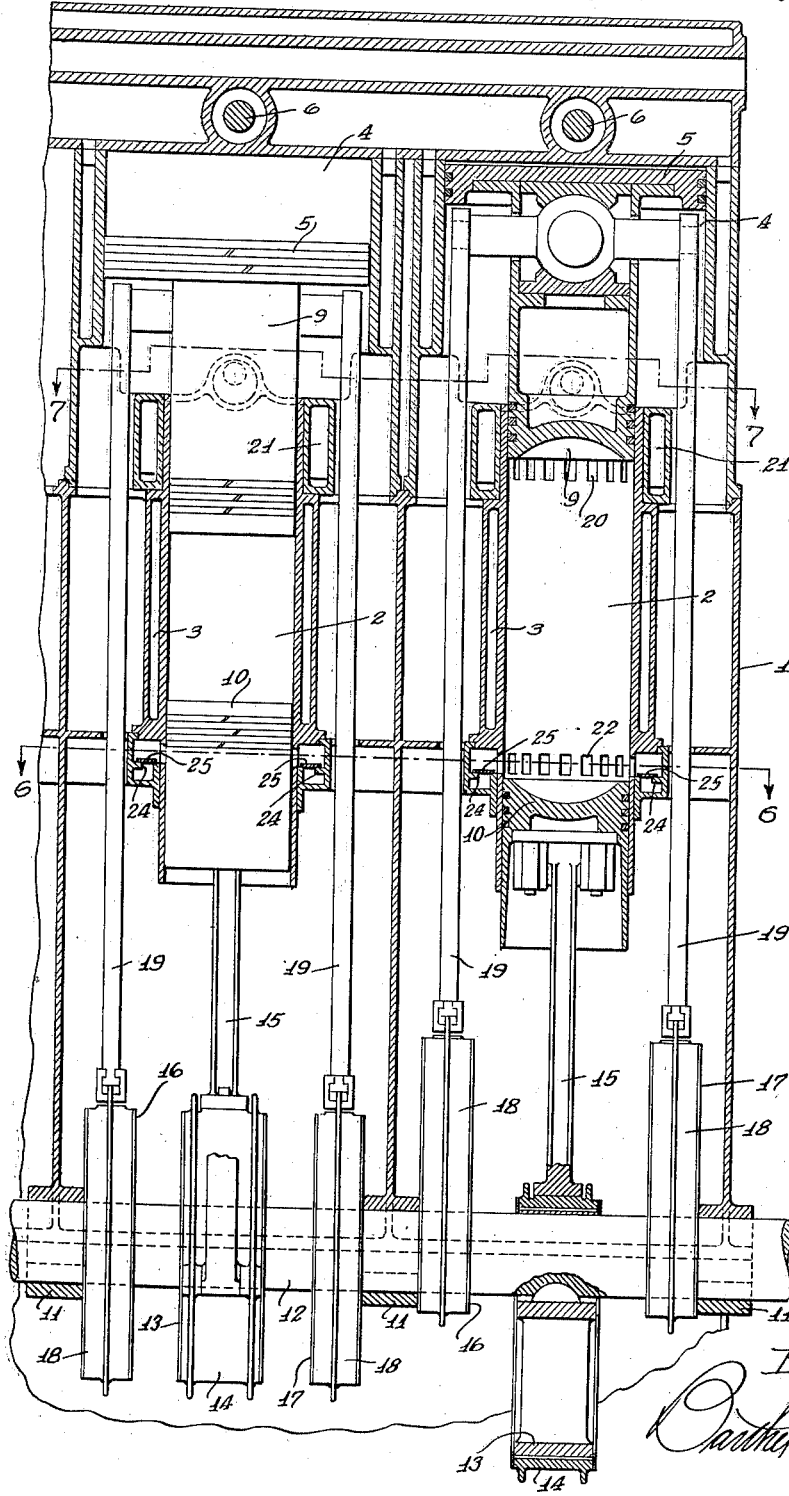
Figure 1 is a vertical longitudinal section of an engine.
Figure 6:
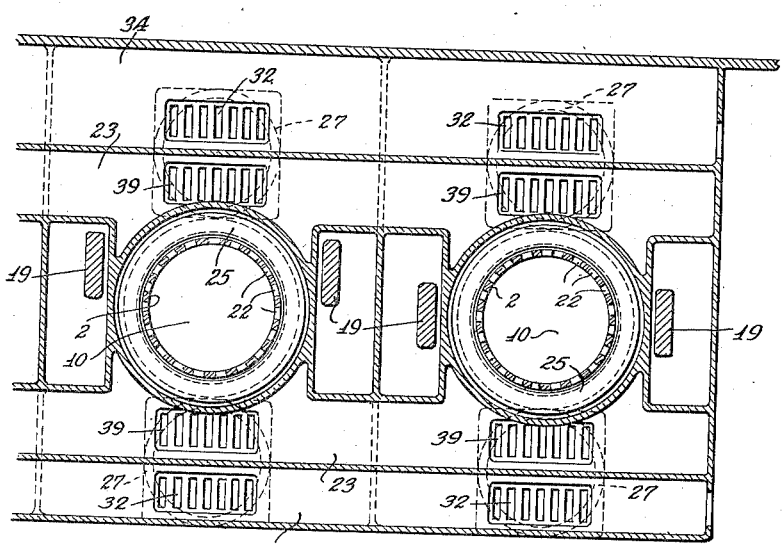
Figure 7:
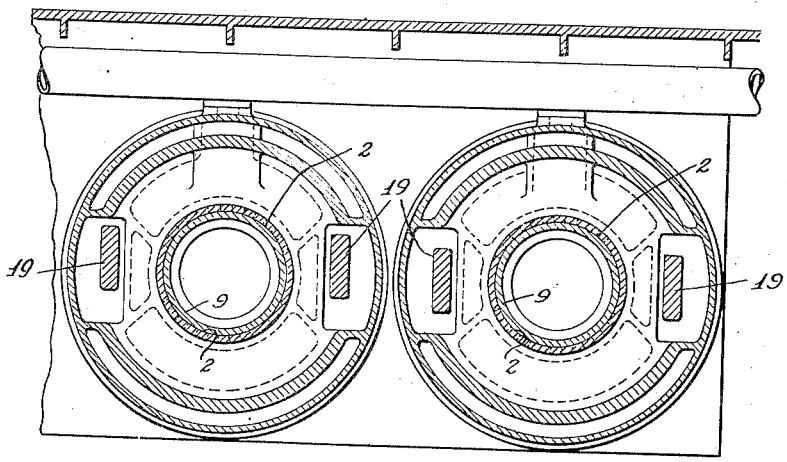

Fig. 5 is a fragmental section corresponding with Fig. 2 and illustrating a different stage in the operation of the engine, and Figs. 6 and 7 are sections taken respectively on the lines 6—6 and 7—7 of Fig. 1.

Like characters of reference are employed throughout to designate corresponding parts.

The numeral 1 designates generally the engine structure having cylinder formations 2 therein disposed with their axes vertical and having water jackets 3 surrounding the same. In co-axial alinement with the upper end of each cylinder formation 2 is a comparatively large cylinder formation 4 with a piston 5 therein and a valve 6 for controlling ports 7 and 8 to admit steam to the cylinder 4 and to exhaust such steam therefrom. The piston 5 is connected directly to a piston 9 which operates in the cylinder formation 2 oppositely with respect to a piston 10 therein.

Supported in the engine structure by bearings 11, in direct alinement with the end of the cylinder formation 2, is a power shaft 12. Adjacent each cylinder formation the power shaft 12 has an eccentric 13 keyed thereon and having an eccentric strap 14 connected to the piston 10 by a pitman 15. On opposite sides of each eccentric 13 are eccentrics 16 and 17 having straps 18 bearing thereon and connected to the upper piston 9 by pitmans 19. The eccentrics 16 and 17 are diametrically opposite to the eccentric 13 thereadjacent and with such an arrangement the opposed strokes of the pistons 9 and 10 are in perfectly timed relation.

Adjacent the upper end of each cylinder formation 2 are provided exhaust ports 20 communicating with an exhaust manifold 21 which surrounds the several steam cylinder formations 4. Adjacent the lower end of each cylinder formation 2 are intake ports 22 adapted to communicate with an intake manifold 23. Surrounding the ports 22 and disposed within the intake manifold 23 is an annular valve seat 24 and an annular valve member 25 rests thereon. As will hereinafter become apparent the valve 25 moves vertically from its seat 24 under certain conditions of operation and limiting stops 26 are provided thereabove to restrict such movement. The intake ports 22 are disposed nearer to the center of the cylinder formation 2 than the exhaust ports 20 so that upon movement of the pistons 9 and 10 away from each other, symmetrically with respect to the center of the cylinder formation 2, the intake ports 22 will be uncovered prior to uncovering of the exhaust ports 20, and during movement toward each other ports 22 will remain uncovered until after the exhaust ports 20 are covered.

Supported beneath the intake manifold 23 on diametrically opposite sides of the cylinder formation 2 are pump chambers 27 having pistons 28 reciprocal therein and connected by links 29 to the eccentric strap 14. Extending across the top of each pump chamber 27 is a valve plate 31 having a series of slots 39 therein. Flexible valve members 30 are supported above said slots and are adapted to be flexed away from the plate to permit passage of air through the slots from the pump chambers 27 to the manifold 23. In the event that pressure in the manifold 23 is greater than the pressure in the pump chambers 27 such pressure forces the valves 30 into contact with the valve plate 31 whereby they close said slots. The valve plate 31 also has a series of slots 32 with flexible valve members 33 supported therebeneath so that air may be drawn from a chamber 34 through the slots 32 to enter the pump chambers 27 providing the pressure in the pump chamber 27 is less than the pressure in the chamber 34. In the event that air pressure in the pump chambers exceeds that in the chamber 34 such pressure maintains the valves 33 in a position closing the slots 32.

In the operation of the present engine the pump pistons 28 charge the intake manifold 23 with air under pressure, and, assuming that combustion has taken place between the pistons 9 and 10 and forced them to the position shown in Fig. 5 where the intake ports 22 are partially uncovered by the piston 10 while the piston 9 is in a position covering the exhaust ports 20, the pressure in the combustion chamber would exceed that in the intake manifold and the normal tendency would be for the exhaust gases to intermingle with the air in the intake manifold. However, at this stage of the operation of the engine the pressure of the burned gases acts upon the annular valve 25 and holds it upon its annular seat 24 until the piston 9 has uncovered the exhaust ports 20 to permit such pressure in the combustion chamber to be dissipated. When the pressure in the intake manifold exceeds that in the combustion chamber, air from the intake manifold drives the burned gases from the combustion chamber through the exhaust ports. As the pistons again move toward each other from the position shown in Fig. 2 to that shown in Fig. 5, the exhaust ports 20 will be covered while the intake ports 22 are partially uncovered and compressed air from the manifold 23 will continue to enter the combustion chamber with the result that it is charged with compressed air prior to closing of the intake ports 22.

Although a specific embodiment of the invention has been illustrated and described, it will be understood that various changes may be made within the scope of the appended claims without departing from the spirit of the invention and such changes are contemplated.

What I claim is:

1. In combination, a cylinder, a pair of opposed pistons in said cylinder, a power shaft, means connecting said pistons with said power shaft for converting rectilinear movement of said pistons into rotary movement of said power shaft, said cylinder having intake and exhaust ports in the wall thereof adapted to be covered and uncovered by respective pistons, the intake ports being disposed whereby they are uncovered and remain uncovered by their respective piston for a longer period in a cycle of the engine than said exhaust ports, a manifold in communication with said intake ports, means for supplying air under pressure to said manifold, a supplemental valve between said intake ports and said manifold and adapted to prevent communication between the interior of said cylinder and said manifold until after the exhaust ports have been uncovered, said means for supplying air under pressure to said manifold comprising a pair of pumps mounted on diametrically opposite sides of said cylinder, and means connecting said pumps with the motion converting means of one of said pistons for actuation thereby.

2. In combination, a cylinder, a pair of opposed pistons in said cylinder, a power shaft mounted in direct alinement with one end of said cylinder, a plurality of eccentrics on said power shafts, one of said eccentrics being disposed in direct alinement with said cylinder and the pistons therein, and a pitman connecting said eccentric to the adjacent piston, two of said eccentrics being disposed with one on each side of the first eccentric and having pitmans extending externally of the cylinder and connected to the other piston, said two eccentrics being diametrically opposite to the first eccentric whereby the movements of the opposed pistons are equal and opposite, said cylinder having intake and exhaust ports in opposite ends thereof adapted to be covered and uncovered by respective pistons, a manifold connected to said intake ports, and means for supplying air under pressure to said manifold.

3. In combination, a cylinder, a pair of opposed pistons in said cylinder, a power shaft mounted in direct alinement with one end of said cylinder, a plurality of eccentrics on said power shafts, one of said eccentrics being disposed in direct alinement with said cylinder and the pistons therein, and a pitman connecting said eccentric to the adjacent piston, two of said eccentrics being disposed with one on each side of the first eccentric and pitmans extending externally of the cylinder and connected to the other piston, said two eccentrics being diametrically opposite to the first eccentric whereby the movements of the opposed pistons are equal and opposite, said cylinder having intake and exhaust ports in opposite ends thereof adapted to be covered and uncovered by respective pistons, a manifold connected to said intake ports, and means for supplying air under pressure to said manifold, said last named means comprising a pair of pumps disposed on diametrically opposite sides of said cylinder and having reciprocal pistons, and connecting rods between the pistons of respective pumps and the first named eccentric.

4. In combination, a cylinder, a pair of opposed pistons in said cylinder, a power shaft mounted in direct alinement with one end of said cylinder, a plurality of eccentrics on said power shafts, one of said eccentrics being disposed in direct alinement with said cylinder and the pistons therein, and a pitman connecting said eccentric to the adjacent piston, two of said eccentrics being disposed with one on each side of the first eccentric and pitmans extending externally of the cylinder and connected to the other piston, said two eccentrics being diametrically opposite to the first eccentric whereby the movements of the opposed pistons are equal and opposite, said cylinder having intake and exhaust ports in opposite ends thereof adapted to be covered and uncovered by respective pistons, a manifold connected to said intake ports, means for supplying air under pressure to said manifold, said intake and exhaust ports being disposed whereby the intake ports are uncovered at a stage in the engine cycle in advance of the uncovering of said exhaust ports and remain uncovered until after said exhaust ports are again covered, and a supplemental valve between said manifold and the interior of said cylinder for preventing communication between said manifold and the interior of said cylinder until after said exhaust ports are uncovered.

5. In combination, a cylinder, a pair of opposed pistons in said cylinder, a power shaft mounted in direct alinement with one end of said cylinder, a plurality of eccentrics on said power shafts, one of said eccentrics being disposed in direct alinement with said cylinder and the pistons therein, and a pitman connecting said eccentric to the adjacent piston, two of said eccentrics being disposed with one on each side of the first eccentric and pitmans extending externally of the cylinder and connected to the other piston, said two eccentrics being diametrically opposite to the first eccentric whereby the movements of the opposed pistons are equal and opposite, said cylinder having intake and exhaust ports in opposite ends thereof adapted to be covered and uncovered by respective pistons, a manifold connected to said intake ports, means for supplying air under pressure to said manifold, said intake and exhaust ports being disposed whereby the intake ports are uncovered at a stage in the engine cycle in advance of the uncovering of said exhaust ports and remain uncovered until after said exhaust ports are again covered, and a supplemental valve between said manifold and the interior of said cylinder for preventing communication between said manifold and the interior of said cylinder until after said exhaust ports are uncovered, said supplemental valve being maintained in a closed position by the pressure of burned gases in said cylinder until such time as such pressure is dissipated by uncovering of said exhaust ports.

6. In combination, a cylinder, a pair of opposed pistons in said cylinder, a power shaft, means connecting said pistons with said power shaft for converting rectilinear movement of said pistons into rotary movement of said power shaft, said cylinder having intake and exhaust ports in the wall thereof adapted to be covered and uncovered by respective pistons, the intake ports being disposed whereby they are uncovered and remain uncovered by their respective piston for a longer period in the cycle of the engine than said exhaust ports, a manifold in communication with said intake ports, means for supplying air under pressure to said manifold, a supplemental valve between said intake ports and said manifold and adapted to prevent communication between the interior of said cylinder and said manifold until after the exhaust ports have been uncovered, an auxiliary cylinder coaxial with the first named cylinder, a piston in said cylinder and connected to one of the pistons in the first named cylinder, and means for admitting steam to and exhausting steam from said auxiliary cylinder.

7. In combination, a cylinder, a pair of opposed pistons in said cylinder, a power shaft mounted in direct alinement with one end of said cylinder, a plurality of eccentrics on said power shafts, one of said eccentrics being disposed in direct alinement with said cylinder and the pistons therein, and a pitman connecting said eccentric to the adjacent piston, two of said eccentrics being disposed with one on each side of the first eccentric and pitmans extending externally of the cylinder and connected to the other piston, said two eccentrics being diametrically opposite to the first eccentric whereby the movements of the opposed pistons are equal and opposite, said cylinder having intake and exhaust ports in opposite ends thereof adapted to be covered and uncovered by respective pistons, a manifold connected to said intake ports, means for supplying air under pressure to said manifold, an auxiliary cylinder coaxial with said first named cylinder, a piston reciprocal in said auxiliary cylinder and connected to a piston in the first named cylinder, and steam intake and exhaust controlling means for said auxiliary cylinder.

EDWARD GRAY.